United States Patent [19]

Yoneda et al.

[11] Patent Number: 4,731,607

[45] Date of Patent: Mar. 15, 1988

[54] DATA INPUT AND DISPLAY DEVICE FOR A NUMERICAL CONTROL GRINDING MACHINE

[75] Inventors: Takao Yoneda, Toyoake; Yasuji Sakakibara, Hekinan; Norio Ohta, Okazaki, all of Japan

[73] Assignee: Toyoda Koki Kabushiki Kaisha, Kariya, Japan

[21] Appl. No.: 815,507

[22] Filed: Jan. 2, 1986

[30] Foreign Application Priority Data

Feb. 15, 1985 [JP] Japan .................................. 60-29001

[51] Int. Cl.⁴ ............................................. G09G 3/02
[52] U.S. Cl. .................... 340/711; 364/169;
364/522; 340/728; 340/729
[58] Field of Search ............... 340/747, 731, 721, 745, 340/729, 730; 364/191, 711, 728, 169, 521, 522

[56] References Cited

U.S. PATENT DOCUMENTS 4,490,781 12/1984 Kishi et al. ........................... 364/191
4,521,860 6/1985 Kanematsu et al. ................. 364/171

FOREIGN PATENT DOCUMENTS 0113682 7/1984 European Pat. Off. .
2094023 9/1982 United Kingdom .

OTHER PUBLICATIONS

"Interactive Computer Graphics" by Herbert Freeman, 1980, pp. 20-23, 42, 43 and 299.
Toyoda Koki Technical Review, vol. 23, No. 3, 1982, pp. 26-31, particularly, Photo (middle) on p. 31.

Primary Examiner—John W. Caldwell, Sr.
Assistant Examiner—Tyrone Queen
Attorney, Agent, or Firm—Oblon, Fisher, Spivak, McClelland & Maier

[57] ABSTRACT

An interactive data input device for a numerical control grinding machine is provided with a key board for inputting data which defines the shapes of a number of machining portions formed on a cylindrical workpiece and a central processing unit for controlling a display controller to display on a screen of a cathode ray tube (CRT) display unit the profile as taken along the workpiece axis, of each machining portion based upon the shape data input by the key board. The central processing unit is programmed to display, in addition to the profiles of the machining portions, the profile of a non-machining portion formed between two machining portions based upon the shape data for the two machining portions.

3 Claims, 9 Drawing Figures

| STEP NO. | 1 | 2 | |
|---|---|---|---|
| SHAPE NO. | 2 | 1 | |
| FINISH DIA. (XR) | 103.150 | 62.200 | |
| SHOULDER DIA. (XA) | 103.150 | 86.450 | |
| LONG. REF. (ZR) | 45.000 | 83.000 | |
| LONG. END (ZA) | 61.000 | 108.500 | |
| ⋮ | ⋮ | ⋮ | |
| CONNECTION | 2 | 1 | |
| FINISH STOCK REMOVAL | 0.010 | 0.012 | |

PDT

DATA INPUT AND DISPLAY DEVICE FOR A NUMERICAL CONTROL GRINDING MACHINE

BACKGROUND OF THE INVENTION

1. Field of the Invention

The present invention relates in general to a data input and display device for use in a numerical control machine tool and more particularly, to such a data input and display device capable of enabling an operator to input shape data for a number of machining portions which are axially arranged on a cylindrical workpiece and of displaying on a display screen the shapes of the machining portions based upon the input shape data.

2. Discussion of the Prior Art

A known device of the aforementioned type is designed for a numerical control lathe as disclosed in U.S. Pat. No. 4,490,781 to H. Kishi et al. In this device, any portion on a workpiece cannot be displayed on a cathode ray tube (CRT) display unit unless data defining the shape of the portion is input. However, this does not raise any substantial problem because it is usual in lathe works to machine every portions on the workpiece.

To the contrary, in grinding works, it is usual to grind some portions on a workpiece, but not to grind some other portions on the workpiece, and no shape data is practically input except for those to be ground of the workpiece. Thus, in a known data input and display device for a model G62A-32X63 CNC full-automatic cylindrical grinder developed by the assignee of the present application, machining portions on a cylindrical workpiece are displayed on a CRT screen, with their shapes being discontinued if the workpiece has a portion not to be ground between two successive machining portions. This disadvantageously results in making it difficult for an operator to grasp the entire shape of the workpiece.

Further, the latter known device is provided with a function to display the workpiece shape along with a moving locus of a grinding wheel on the CRT screen for checking by the operator, of an interference of any non-machining workpiece portion with the grinding wheel. However, such interference checking is not reliable since the entire shape of the workpiece is not displayed on the CRT screen. Although the known device permits shape data for such a non-machining portion to be entered for displaying the entire shape of the workpiece, the inputting of the shape data for the non-machining portion is troublesome and therefore, is practically done.

SUMMARY OF THE INVENTION

Accordingly, it is a primary object of the present invention to provide an improved data input and display device capable of displaying, in addition to the shapes of machining portions, the shape of a non-machining portion on a display unit without shape data therefor.

Another object of the present invention is to provide an improved data input and display device of the character set forth above which is particularly designed to display on a display unit a non-machining portion which is formed between two successive machining portions of a cylindrical workpiece based upon shape data for the machining portions.

Briefly, according to the present invention, there is provided with a data input and display device for displaying on a screen of a display unit the shape of a cylindrical workpiece on which a number of first portions to be ground and at least one second portion not to be ground are axially arranged. The device comprises a shape data input device, by which shape data defining the shape of each of the first portions are input for storage in a memory device. A main display control device is provided, which operates to display on the screen of the display unit the shapes of the first portions based upon the shape date stored in the memory device. An auxiliary display control device is further provided, which operates to display on the screen of the display unit the shapes of the at least one second portion based upon the shape data stored in the memory device for the first portions.

With this configuration, since the shape data for the first portions are utilized to display the second portion, the operator can be relieved of troublesome works to input shape data for the second portion. This is particularly advantageous in the case where the workpiece has many portions not to be ground. Moreover, it becomes easy for the operator not only to grasp the displayed entire shape of the workpiece, but also to look for an interference of the second portion with a grinding wheel when the moving locus of the grinding wheel is displayed together with the shape of the workpiece in a usual manner.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which.

DETAILED DESCRIPTION OF THE PREFERRED EMBODIMENT

Figure 1:
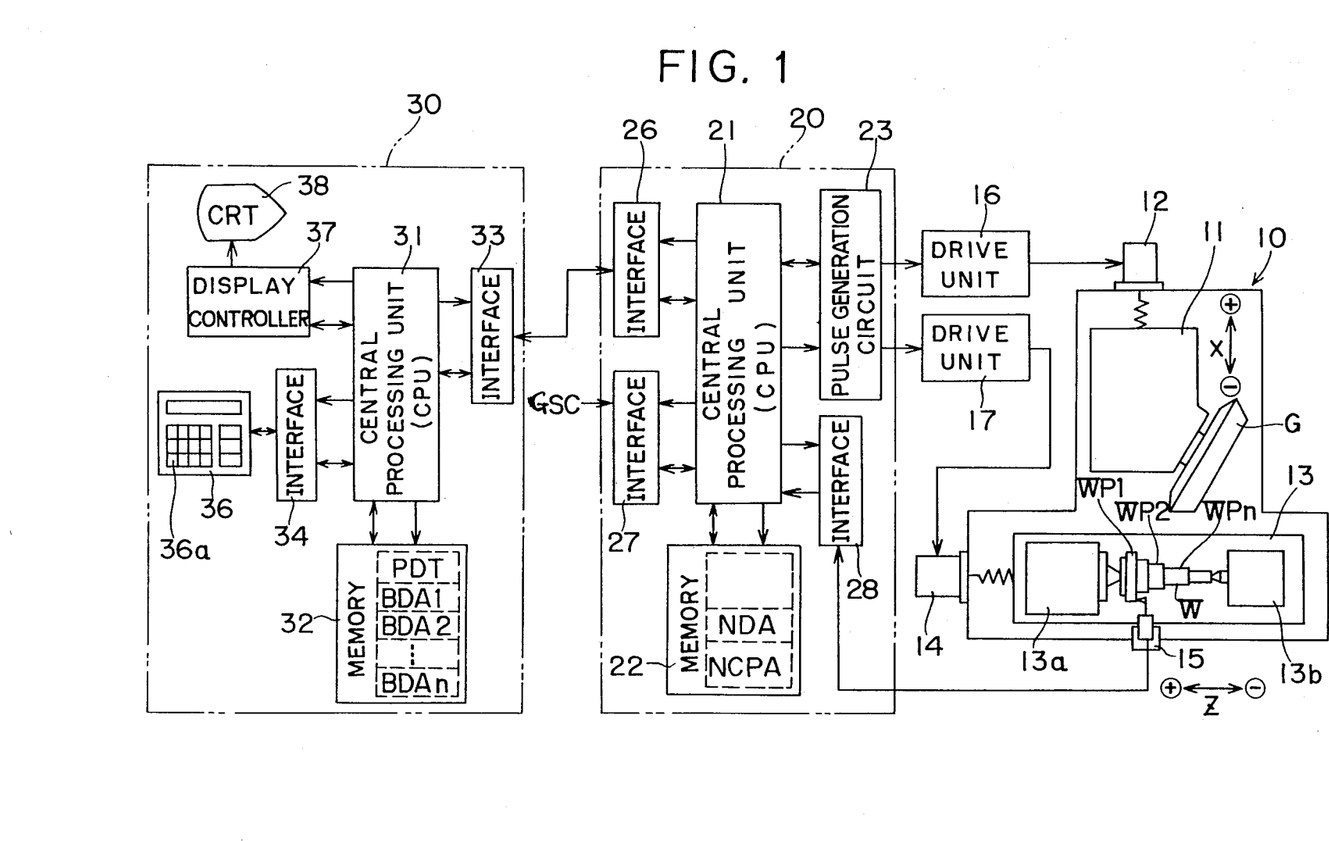
FIG. 1 is a block diagram of a numerical control system with a data input and display device according to the present invention, also illustrating the schematic configuration of a numerical control grinding machine in a plan view.

Referring now to the drawings and particularly to FIG. 1 thereof, a numeral 10 denotes a grinding machine, 20 a numerical controller and 30 an interactive data input device. The grinding machine 10 comprises a wheel head 11 rotatably carrying a grinding wheel G and a work table 13 mounting a wheel head 13a and a tail stock 13b for rotatably carrying a cylindrical workpiece W thereon. The wheel head 11 and the work table 13 are movable by servomotors 12, 14 which are rotationally driven by drive units 16, 17, respectively. A numeral 15 denotes an end surface sizing device for use in axially positioning the workpiece W in a Z-axis direction perpendicular to an X-axis direction in which the wheel head 11 is movable.

The numerical controller 20 is composed of a central processing unit (hereafter referred to as "CPU") 21, a memory 22, a pulse generation circuit 23, and interfaces 26, 27, 28. The pulse generation circuit 23 is connected to supply the drive units 16, 17 with feed pulses. The memory 22 is formed therein with a numerical data storage area NDA and a numerical control (NC) program storage area NCPA. The NC program storage area NCPA stores a plurality of machining NC programs which respectively correspond to a plurality of machining cycles including an angle infeed cycle. In each of the NC programs, actual feed amounts and rates and the like are not programmed, but they are programmed using variables each designated one of numerical data blocks which are stored in the numerical data storage area NDA. The numerical data storage area NDA comprises a plurality of data areas, in each of which information representing the kind of a grinding cycle, the grinding order number and data indicating feed amounts, feed rates and the like are stored for each of stepped portions WP1, WP2, ... WPn to be machined of the workpiece W.

The interactive data input device 30 is composed of a CPU 31, a memory 32, a key board 36, a display controller 37, a cathode ray tube (CRT) display unit 38 and interfaces 33, 34,. The CPU 31 is coupled to the CPU 21 of the numerical controller 21 through the interface 33 and 26. The CPU 31 is provided with a function to automatically prepare numerical data for respective machining steps or workpiece portions WP1, WP2 ... WPn to be ground, based upon finish shape information which is input using the CRT display unit 38 and the key board 36 in an interactive manner. The automatically prepared numerical data are temporarily stored in buffer areas BDA1-BDAn of the memory 32 and then, are transferred through the interface 33 to the numerical controller 20 for storage in the numerical data storage area NDA of the memory 22.

The operation of the interactive data input device 30 will be described hereafter.

When a new workpiece W is to be machined, the operational mode of the interactive data input device 30 is switched to a data input mode. In response to this, the CPU 31 executes processings which are conceptually shown in FIG. 2.

Figure 2:
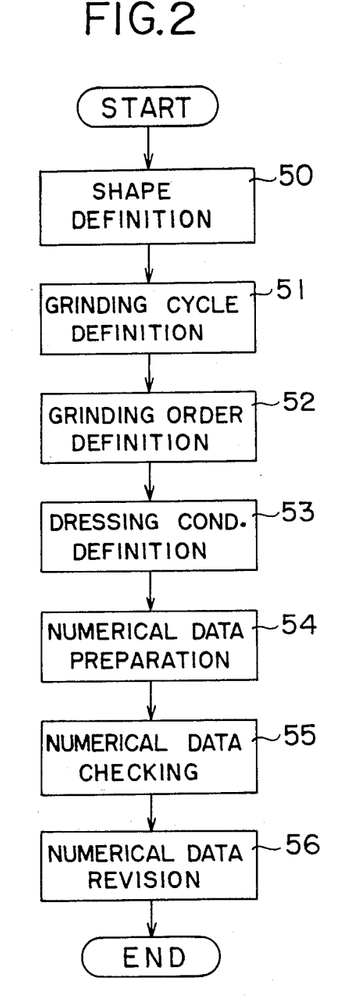
FIG. 2 is a flow chart of processings executed by a central processing unit 31 shown in FIG. 1 in a data input mode.

The data input processings are roughly classified to a shape definination step (50) for inputting shape data for each of workpiece machining portions, a grinding cycle definition step (51) for defining machining cycles in which the machining portions WP1, WP2, ... WPn are to be ground respectively, a grinding order definition step (52) for defining the grinding order, and a dressing definition step (53) for defining the conditions and the like for grinding wheel dressing. The processings are further classified to a numerical data preparation step (54) for preparing numerical data based upon those input in the steps (51)–(53), a numerical data checking step (55) for checking the prepared numerical data by displaying on a screen of the CRT display unit 38 a moving locus of the grinding wheel G and the shape of the workpiece W based upon the prepared numerical data, and a numerical data revision step (56) for revising parts of the prepared numerical data.

Figure 3:
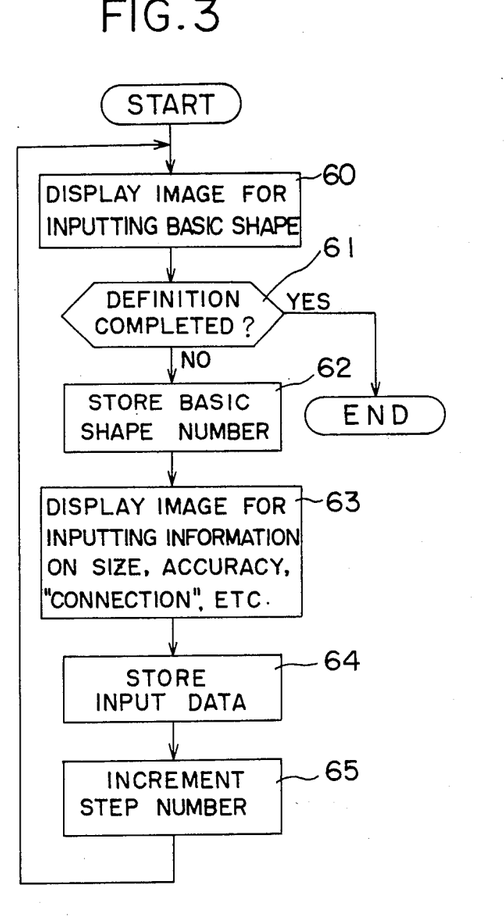
FIG. 3 is a flow chart of detailed processings executed in step 50 of FIG. 2.
Figure 6A:
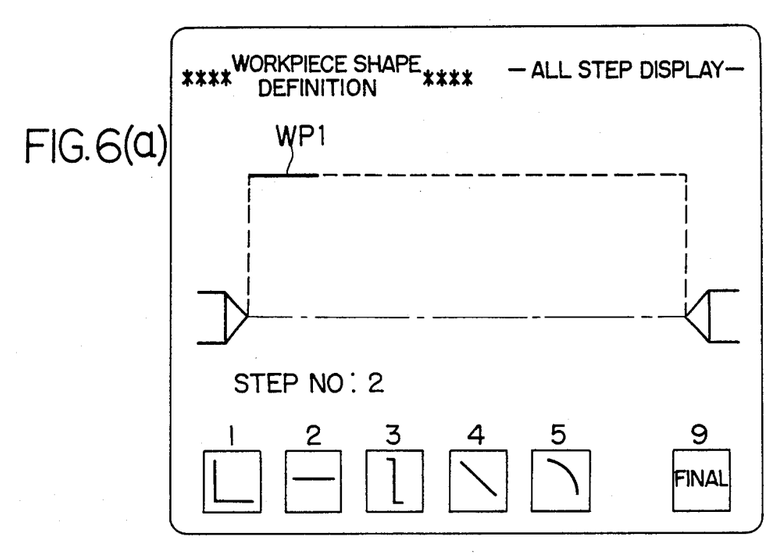
FIGS. 6(a)–6(c) are explanatory views of images displayed on a screen of a cathode ray tube display unit 38 shown in FIG. 1.

The present invention features the shape definition step (50) of these steps, and therefore, further description will be made hereafter with respect to the shape definition step (50). FIG. 3 shows a number of subordinate steps (60)–(65) constituting the shape definition step (50), and these steps (60)–(65) are executed for each of the workpiece portions WP1, WP2, ... WPn to be ground as follows:

That is, the shape definition step (50) starts from step (60), in which a processing is executed to display a basic shape input image as shown in FIG. 6(a), and then, the CPU 31 is caused to wait until numeric keys 36a on the key board 36 are manipulated. When the situation is that the inputting of shape data has been completed for all of the workpiece portions WP1, WP2, ... WPn to be machined, a 9-imprinted numeric key on the key board 36 is depressed to instruct the completion of shape data inputting. However, when the inputting of shape data is to be continued, the shape of a machining portion which is designated by a grinding step number on the CRT screen is selected by depressing one of 1–5 imprinted numeric keys on the key board 36. FIG. 6(a) shows a situation in which the shape data inputting for a first machining portion WP1 has been completed. When the shape data of a second workpiece portion WP2 is to be input next, one of the 1–5 imprinted numeric keys is depressed depending upon the shape of a second machining portion WP2. Assuming now that the shape of the second machining portion WP2 is a cylindrical portion with a shoulder, for example, a 1-imprinted numeric key is depressed.

Figure 5:
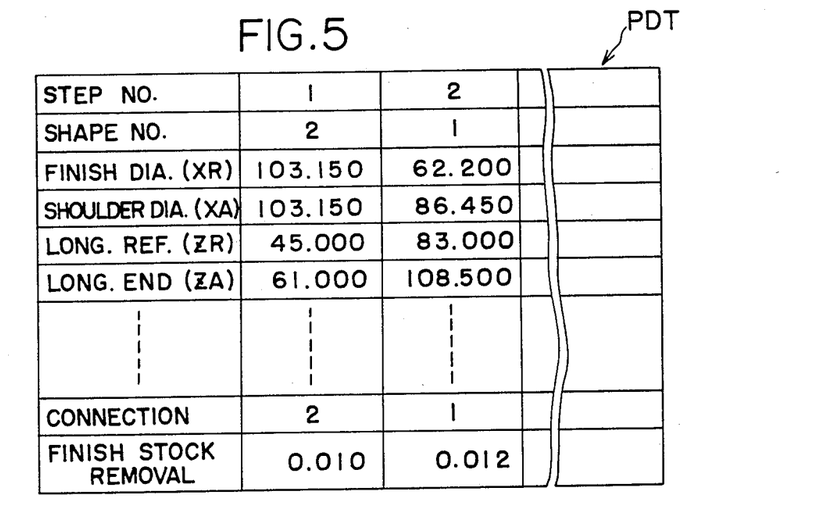
FIG. 5 is an explanatory view showing the detail of a shape data table PDT shown in FIG. 1.
Figure 6B:
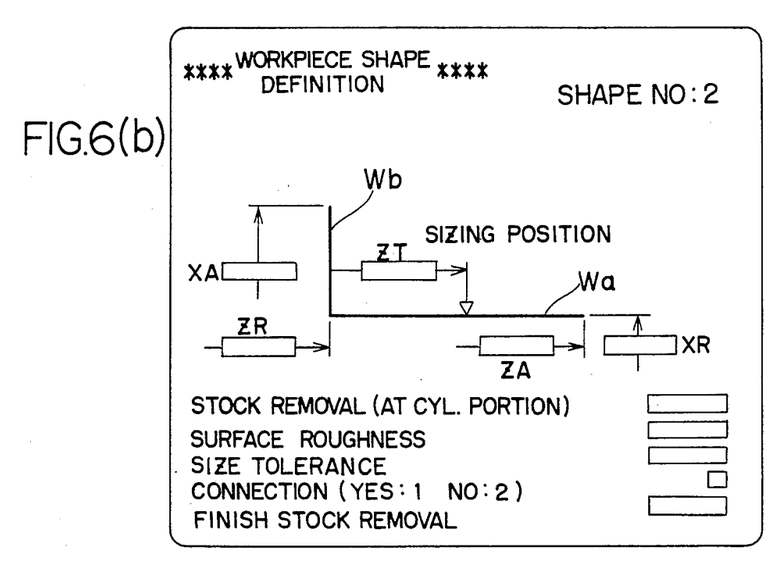

In response to this, the CPU 31 moves from step (61) to step (62) to store in the shape data table PDT as best shown in FIG. 5 data indicating that the shape number for the second machining portion WP2 is "1" (one). Step 63 is subsequently reached, wherein a processing is executed to display a dimension data input image on the screen of the CRT display unit 38. The dimension data input image depends upon the shape of a machining portion, and where "1" has been set as the shape number as in this illustrated instance, machining surfaces of the cylindrical and shoulder portions are symbolically displayed as shown in FIG. 6(b).

This displayed image is used to input a longitudinal reference ZR, a longitudinal end ZA, a finish diameter XR, a shoulder diameter XA and a sizing position ZT which are defined as follows:

ZR: left end position of cylindrical portion Wa from left end of workpiece W in Z-axis direction ZA: right end position of cylindrical portion Wa from left end of workpiece W in Z-axis direction XR: finish diameter of cylindrical portion Wa XA: Outer circle diameter of shoulder portion Wb ZT: position from shoulder portion Wb in Z-axis direction where diameter sizing device (not shown) engages cylindrical portion Wa The displayed image is further used to input data indicative of a stock removal, a surface roughness and so forth. Further, where a portion not to be ground (hereafter as "non-machining portion") is between a present workpiece portion WP2 and previous workpiece portion WP1, "connection" or "non-connection" data is input to give a command as to whether the non-machining portion is to be displayed or not. In this particular embodiment, "1" represents "connection", and "2" represents "non-connection." The inputting of any data is attained by manipulating the numeric keys 36a of the key board 36, with a cursor (not shown) on the displayed CRT screen image being positioned at associated one of windows for the data, as is well known in the art.

After data indicative of dimension, accuracy, "connection", (or "non-connection") and the like are input in this manner, the CPU 31 executes step (64) to store these data in storage locations which are assigned in the shape data storage area PDT in correspondence to the step number of the machining portion WP2. Step (65) follows to increment the step number, and return is made to step (60). This results in displaying on the screen of the CRT display unit 38 a partial workpiece shape inclusive of the second machining portion WP2 for which shape data have just been input. Since the connection data has been input in the data input operation for the second machining portion WP2, the first and second machining shapes WP1, WP2 are displayed connected by a broken line with each other, whereby the shape of a non-machining portion between the first and second machining portions WP1, WP2 can be easily grasped by the operator.

If the workpiece W has three or more machining portions, the above-noted steps (60)–(65) are repeated for a further machining portion WPn, so that shape data are input for all of the machining portions WP1–WPn on the workpiece W.

Figure 4:
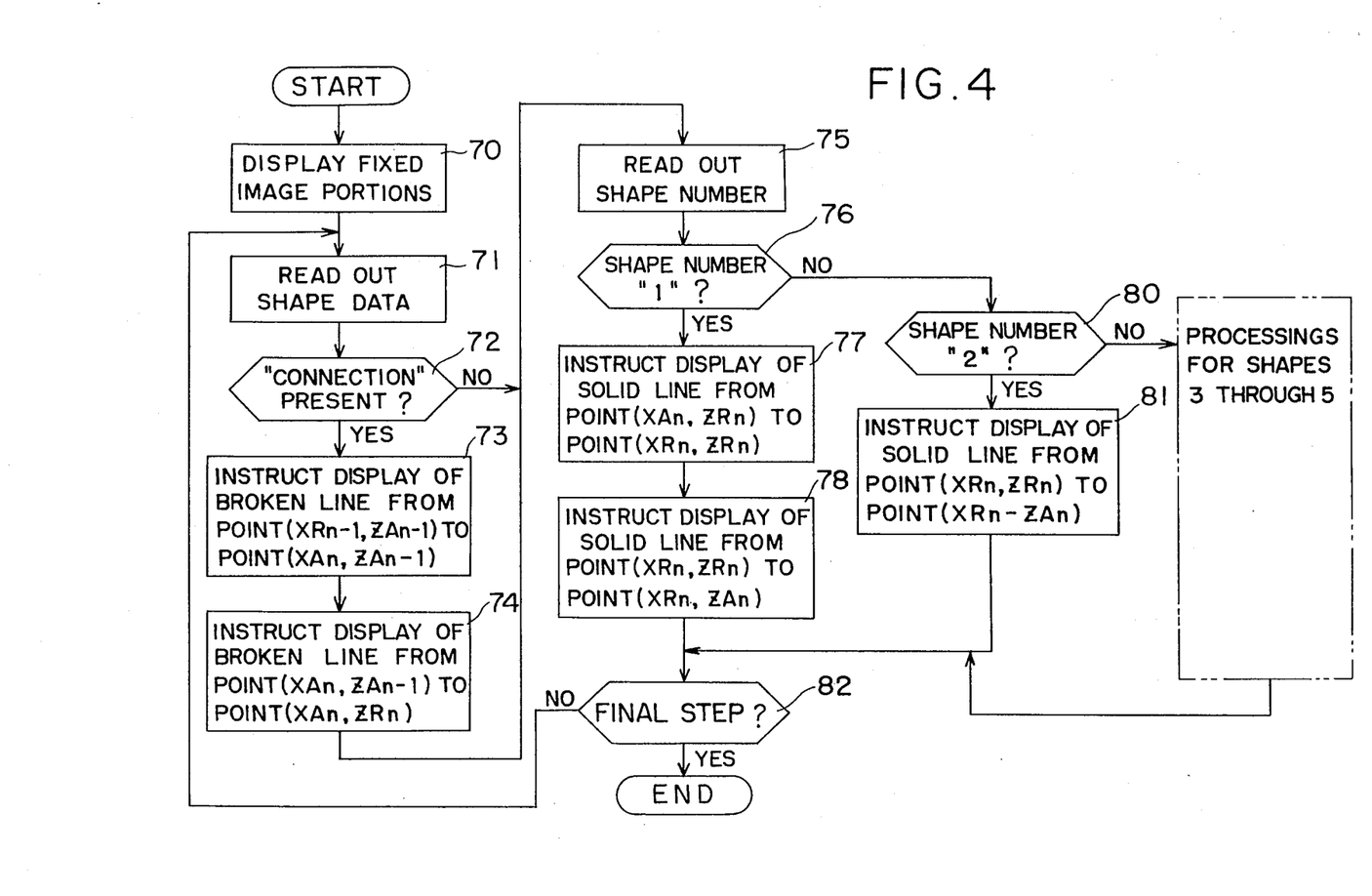
FIG. 4 is a flow chart of further detailed processings executed in step 60 of FIG. 3.
Figure 6C:
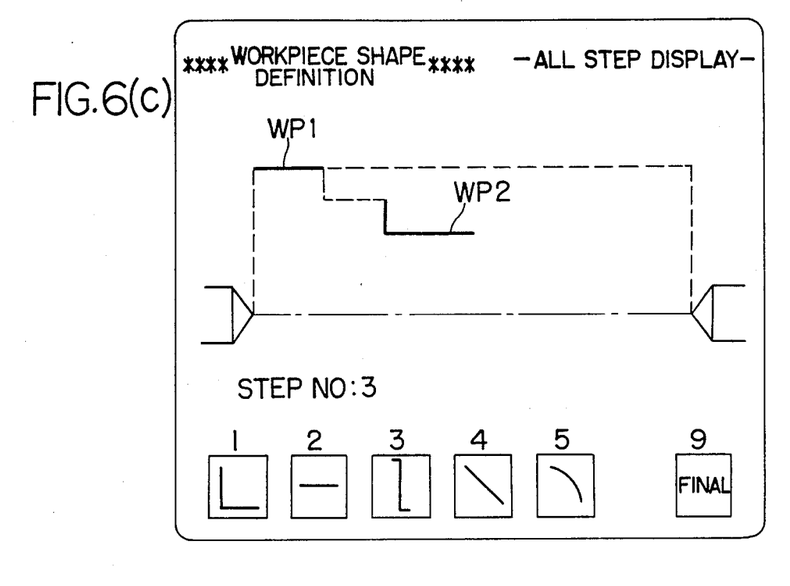

FIG. 4 shows the detail of step (60) in FIG. 3. In step (70), data for displaying invariable or fixed parts such as title, center line, kinds of machinings and the like of those shown in FIGS. 6(a) and 6(c) are transferred to the display controller 37 so as to display such fixed parts on the screen of the CRT display unit 38. Thereafter, step (71) is reached wherein shape data for one machining portion is read out from the shape data table PDT shown in FIG. 5, and in step (72), it is ascertained based upon the read-out data where the "connection" has been instructed or not. When data "2" indicative of the "non-connection" has been stored as the connection data as in the case of the first machining portion WP1, step (72) is followed by step (75) to bypass the processings for display of a connection in steps (73), (74). Since a shape number "2" input for the first machining portion WP1 is read out in step (75) from the shape data table PDT, the processing routine of the CPU 31 is moved from step (76) to steps (77), (78) in turn, whereby the shape of the first machining portion WP1 is displayed as shown in FIG. 6(a).

Figure 7:
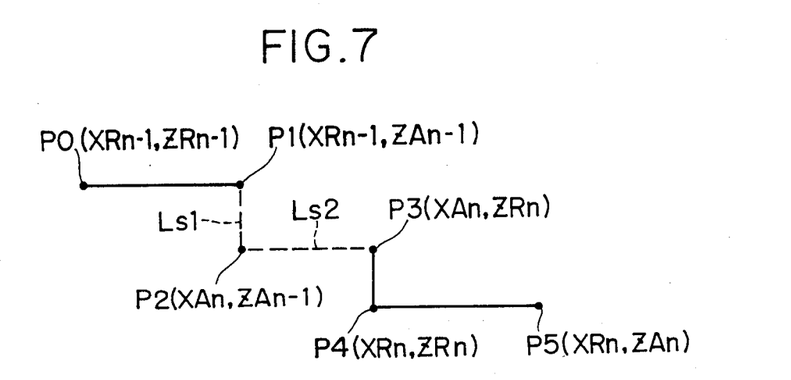
FIG. 7 is an explanatory view showing the positions in a Z-X axis coordinate system, of displayed line segments.

Thereafter, the processing routine of the CPU 31 returns via step (82) to step (71) unless the shape of the final machining portion WPn has been displayed. Thus, the shape data for the second machining portion WP2 is read out from the shape data table PDT in step (71). Since the read-out shape data for the second machining portion WP2 includes data "1" instructing the "connection" as a connection command, step (72) is followed by step (73), in which processings are performed to display a connection portion. This is, where a cylindrical portion Wa with a shoulder Wb is to be newly displayed along with a "connection", a broken line segment Ls1 is displayed from the right end P1 of the preceding cylindrical portion WP1 to a point P2 in step (73), and another broken line segment Ls2 is displayed from the point P2 to a point P3 indicating the radial outer end of the shoulder portion Wb in step 74, as shown in FIG. 7. The point P2 indicates an intersection of the line segment Ls1 radially extending passing though the point P1, with the line segment Ls2 axially extending passing through the point P3.

The display of the above-noted broken line segment Ls1 is carried out by converting coordinate values (XRn-1, ZAn-1) and (XAn, ZAn-1) of the points P1 and P2 on the machine into corresponding coordinage values on the screen of the CRT display unit 38 and then, by supplying the display controller 37 with the converted coordinate values and a command for display by a broken line. Similarly, the display of the broken line segment Ls2 connecting the point P2 with the point P3 is carried out by converting coordinate values (XAn, ZAn-1) and (XAn, ZRn) of the points P2 and P3 on the machine into corresponding coordinate values on the screen of the CRT display unit 38 and then, by supplying the display controller 37 with the converted coordinate values and the command for display by a broken line.

Upon completion of the processings for the connection portion in the aforementioned manner, step (75) is reached to read out the shape number for a portion to be newly displayed, and the processings in step (76) and other steps successive thereto are in turn executed, whereby a machining shape which is defined by the shape number and the dimension data read out in step (71) is displayed on the CRT screen. Since a workpiece portion to be newly displayed in this illustrated instance is the second machining portion WP2 including a cylindrical portion Wa with a shoulder Wb, a solid line segment connecting the point P3 with a point P4 is displayed as the shoulder portion Wb in step (77), and another solid line segment connecting the point P4 with a point P5 is displayed as the cylindrical portion Wa in step (78). Ascertainment is then made in step (82) as to whether the displayed workpiece portion WP2 is a final machining portion WPn or not, and if not a final machining portion WPn, return is made to step (71) to repeat the foregoing processings for a further machining portion WP3 or WPn. Consequently, a plurality of machining portions WP1–WPn of which shape date have been stored in the shape data table PDT and non-machining portions each existing between any consecutive two of the machining portions WP1-WPn are displayed on the screen of the CRT unit 38.

In this manner, not only the shape of the machining portions WP1–WPn but also the shapes of non-machining portions of which no shape data have not been input are displayed on the screen of the CRT display unit 38. Thus, it become easy for the operator to ascertain the displayed entire shape of the workpiece W. Additionally, in the numerical data confirmation processing executed in step 55 of FIG. 2, the moving locus of the grinding wheel G is displayed together with the entire shape of the workpiece W after the same is displayed by the execution of the routine shown in FIG. 5, and this makes it easy for the operator to look for an interference of the grinding wheel G with any non-machining portion of the workpiece W.

Obviously, numerous modifications and variations of the present invention are possible in light of the above teachings. It is therefore to be understood that within the scope of the appended claims, the present invention may be practiced otherwise than as specifically described herein.

What is claimed is:

1. A data input and display device for a numerical control grinding machine, comprising:

a display unit having a screen capable of displaying a shape of a cylindrical workpiece on which a number of first portions to be ground and at least one second portion not to be ground are axially arranged;

shape data input means for inputting shape data defining the shape of each of said first portions;

memory means coupled to said shape data input means for storing said shape data input by said shape data input means;

main display control means coupled to said memory means and said display unit for controlling displaying on said screen of said display unit the shapes of said number of first portions based upon said shape data stored in said memory means; and auxiliary display control means coupled to said memory means and said display unit for controlling displaying on said screen of said display unit the shape of said at least one second portion based upon said shape data which are stored in said memory means for said number of first portions;

wherein said at least one second portion is between one of said first portions and another of said first portions, and the shape data input by said shape data input means includes coordinate data defining an end point of said one of said first portions and a beginning point of said another of said first portions; and said auxiliary control means comprising, means for converting said coordinate data into corresponding coordinate values on the screen of the display unit, and means for controlling the display on the screen such that the coordinate values on the screen are visually interconnected, whereby said auxiliary display control means is operable to display on said screen of said display unit the shape of said at least one second portion in such a manner as to interconnect the shapes of said one first portion and said another first portion.

2. A data input and display device as set forth in claim 1, wherein said main and auxiliary display control means are operable to display the shapes of said first a and second portions in the form of line segments each represnting the profile of an associated one of said first and second portions as taken along the rotational axis of said workpiece, and wherein said auxiliary display control means comprises:

first control means for controlling displaying on said screen of said display unit a first line segment which extends radially of said workpiece from the converted coordinate value corresponding to the coordinate data defining the end point of said one first portion; and second control means for displaying on said screen of said display unit a second line segment which extends axially of said workpiece from the converted coordinate value corresponding to the coordinate data defining the beginning point of said another first portion to an intersection with said first line segment.

3. A data input and display device as set forth in claim 2, wherein said first and second line segments are different in display mode from said line segments representing the profiles of said first portions.

* * * * *